United States Patent
Suzuki et al.

(10) Patent No.: US 7,175,376 B2
(45) Date of Patent: Feb. 13, 2007

(54) METHOD OF CUTTING LONG-SIZED HARDENED STEEL MATERIAL AND CUTTING DEVICE

(75) Inventors: Kiyoshi Suzuki, Yokohama (JP); Takeki Shirai, Shinagawa-ku (JP); Chandra Shekhar Sharuma, Shinagawa-ku (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 10/297,947

(22) PCT Filed: Apr. 25, 2002

(86) PCT No.: PCT/JP02/04132

§ 371 (c)(1),
(2), (4) Date: Dec. 26, 2002

(87) PCT Pub. No.: WO02/087812

PCT Pub. Date: Nov. 7, 2002

(65) Prior Publication Data
US 2003/0103829 A1 Jun. 5, 2003

(30) Foreign Application Priority Data
Apr. 27, 2001 (JP) ............................. 2001-133504

(51) Int. Cl.
*B23D 1/08* (2006.01)
(52) U.S. Cl. ............... 409/293; 409/296; 409/178; 29/898.03
(58) Field of Classification Search ........... 407/119; 409/293, 296, 298, 304, 308, 178; 82/1.11; 29/898.03; 384/43
See application file for complete search history.

(56) References Cited

U.S. PATENT DOCUMENTS 3,149,535 A * 9/1964 Vaughn ................ 409/304

(Continued)

FOREIGN PATENT DOCUMENTS

DE 1 300 783 B 10/1969

(Continued)

OTHER PUBLICATIONS

German Office Action Application No. 102 91 792.2-14 dated Jul. 31, 2006.

*Primary Examiner*—Dana Ross
(74) *Attorney, Agent, or Firm*—Westerman, Hattori, Daniels & Adrian, LLP.

(57) ABSTRACT

The present invention mainly aims to provide cutting method and cutting apparatus for manufacturing a guide rail of a rolling guide device by efficiently cut-working a long scale hardened steel. In order to achieve such object, there is provided a cutting method of linearly cutting a work surface (3) of the long scale hardened steel (2) along the longitudinal direction thereof. In this process, it is desired to arrange a plurality of CBN tools (7) along the longitudinal direction of the long scale hardened steel (2) to thereby sequentially cut the work surface (3). Furthermore, a cutting apparatus of the present invention comprises a fixing device (4) for fixing the long scale hardened steel (2), a tool rest (5) which is guided by a guide device (6) disposed along the longitudinal direction of the fixing device (4) and the CBN tool (7) cut-working the work surface (3) of the long scale hardened steel (2) held by the tool rest (5).

8 Claims, 15 Drawing Sheets

U.S. PATENT DOCUMENTS

| | | | | |
|---|---|---|---|---|
| 3,497,403 | A | * | 2/1970 | McWilliams et at. ....... 148/581 |
| 4,534,689 | A | * | 8/1985 | Theurer ...................... 409/178 |
| 4,789,277 | A | * | 12/1988 | Rhodes et al. ............. 409/131 |
| 5,964,016 | A | * | 10/1999 | Ito et al. ...................... 29/27 C |
| 6,094,819 | A | * | 8/2000 | Teramachi et al. ....... 29/898.03 |
| 6,117,533 | A | * | 9/2000 | Inspektor .................... 407/119 |
| 6,296,428 | B1 | * | 10/2001 | Yamashita et al. .......... 409/293 |
| 6,769,335 | B2 | * | 8/2004 | Kaminski .................... 82/1.11 |
| 2001/0003569 | A1 | * | 6/2001 | Ota et al. .................... 407/118 |
| 2002/0146292 | A1 | * | 10/2002 | Shimizu ..................... 407/113 |

FOREIGN PATENT DOCUMENTS

| | | |
|---|---|---|
| DE | 80 34 887 U1 | 12/1980 |
| DE | 197 42 765 A1 | 4/1999 |
| EP | 0 834 486 A2 | 4/1998 |
| JP | 6-249317 | 9/1994 |
| JP | 8-118136 | 5/1996 |
| JP | 8-128410 | 5/1996 |

* cited by examiner

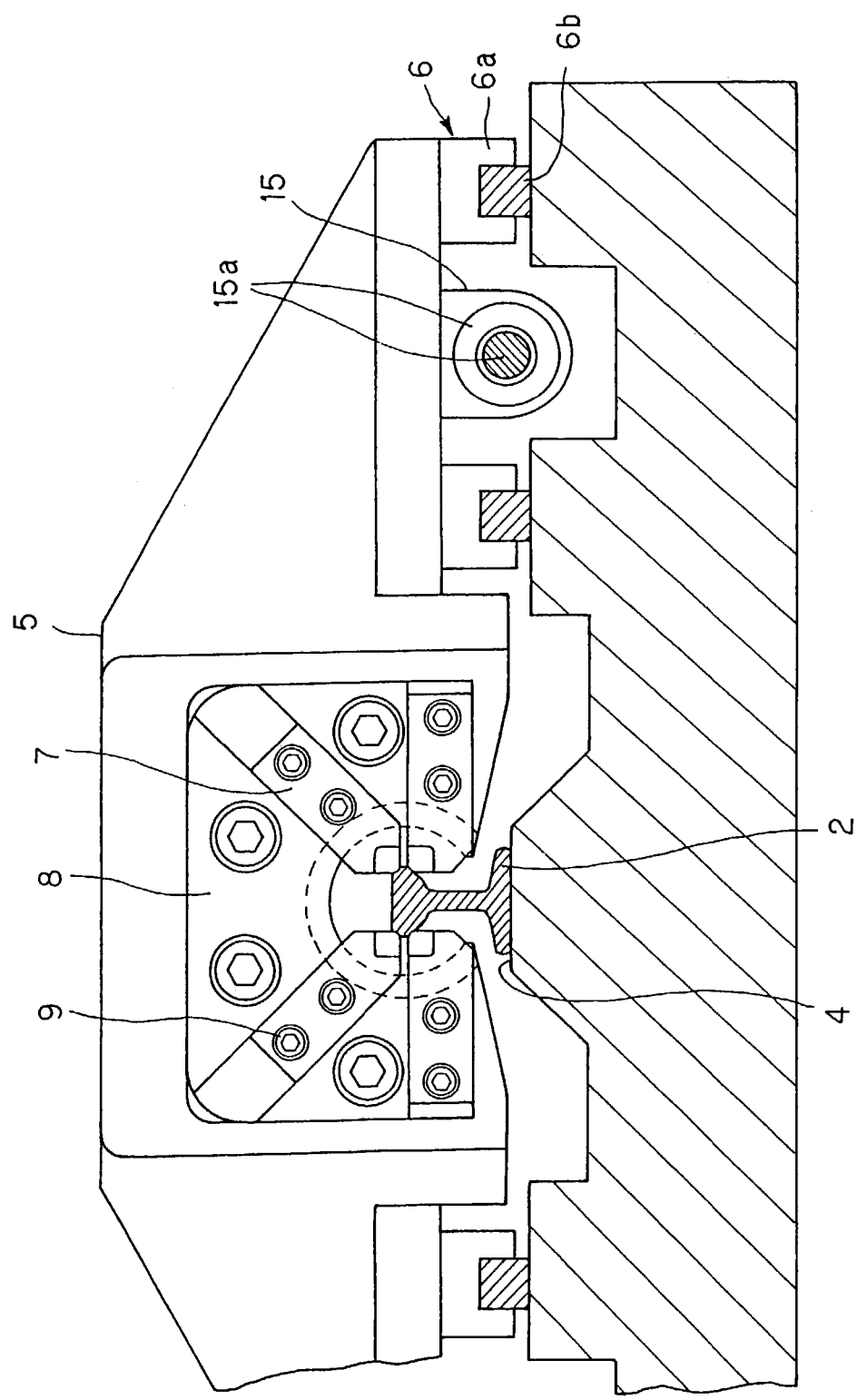

METHOD OF CUTTING LONG-SIZED HARDENED STEEL MATERIAL AND CUTTING DEVICE

TECHNICAL FIELD OF THE INVENTION

The present invention relates to a cutting method and cutting apparatus for cutting extremely efficiently a hardened steel material having a long scale (called hereinlater "long scale hardened steel" or merely "hardened steel") used as work piece such as guide rail of a rolling guide device.

BACKGROUND ART

As shown in FIGS. 14 to 16, a rolling guide device 101 for guiding a table carrying work piece mounted to a machine tool comprises a track table 102 having a rolling member rolling surface (which may be called "rolling member rolling groove") 105 formed along a longitudinal direction thereof, an endless circulation passage 110 including a loaded rolling member rolling passage 107 corresponding to the rolling member rolling surface 105, and a movable table 104 to be mounted to the track table 102 through a number of rolling members 103 arranged in the endless circulation passage 110. The track table 102 and the movable table 104 are constructed to be relatively movable by the rolling motion of the rolling members 103.

In such rolling guide device 101, the track table 102 has a complicated sectional shape such as a long scale hardened steel 2 shown in FIG. 2. It is required for the track table 102 to be formed, with high dimensional precision, the rolling member rolling surface 105 having a predetermined surface hardness. Such track table 102 is manufactured by a method of shaping a long scale round steel into a product having dimension and shape similar to those of a final product by drawing it through the hole in a modified die, hardening it to obtain a predetermined surface hardness and, then, finely finishing it so as to obtain a predetermined dimension and shape through cut-working.

In the track table manufacturing method of conventional art, there is adopted the drawing working capable of shaping a work with high precision having a complicated sectional shape and the cutting working capable of finely finishing it so as to have a predetermined dimension, so that the track table having a dimension with high accuracy can be manufactured.

The conventional track table, however, has been manufactured through the drawing working and cutting working which have required much working time and provided problem on working efficiency. According to this view, the track table could not efficiently manufactured.

DISCLOSURE OF THE INVENTION

The present invention was conceived to solve the above subjects and to provide cutting method and cutting apparatus for manufacturing, with high efficiency and high performance, a long scale hardened steel utilized as a work for a guide rail of a rolling guide device.

A cutting method of cutting a long scale hardened steel, for achieving the above object, is characterized in that a work surface of a long scale hardened steel along a longitudinal direction thereof is linearly cut by a CBN tool at a cutting speed of approximately 30 m/min. to 160 m/min.

According to this invention, the wearing amount of the CBN tool can be reduced by linearly cutting the long scale hardened steel at such cutting speed, so that the long scale hardened steel can be cut with extremely high efficiency and high precision in dimension, and as a result, a guide rail of a rolling guide device or like can be extremely efficiently manufactured.

In the cutting method of the long scale hardened steel of the present invention, it is preferred that a plurality of work surfaces of a long scale hardened steel along a longitudinal direction thereof are linearly cut simultaneously by a plurality of CBN tools. According to this invention, a plurality of work surfaces can be extremely efficiently cut-worked.

In the cutting method of the long scale hardened steel of the present invention, it is preferred that a plurality of CBN tools are arranged along the longitudinal direction of the long scale hardened steel and the work surface of the long scale hardened steel is cut sequentially along the longitudinal direction thereof. According to this invention, by moving the CBN tools arranged along the longitudinal direction of the long scale hardened steel from one side in the longitudinal direction thereof towards the other side, the work surface can be cut-worked in extremely short time.

In the cutting method of the long scale hardened steel of the present invention, it is preferred that the long scale hardened steel is a hardened steel for a guide rail of a rolling guide device. According to this invention, the guide rail of the rolling guide device can be extremely efficiently manufactured.

In the cutting method of the long scale hardened steel of the present invention, it is preferred that a plurality of CBN tools are arranged on a virtual plane normal to the longitudinal direction of the long scale hardened steel so as to provide linear symmetric or point symmetric arrangement. In this case, it is also preferred that at least one pair of CBN tools for cutting the work surface of the long scale hardened steel are arranged so that radial forces of cutting resistance thereof are mutually balanced. According to this invention, since the CBN tools are arranged so that the radial forces due to the cutting resistance in the cutting operation of the symmetrically arranged CBN tools are balanced, the generation of deflection of the long scale hardened steel and the CBN tools can be controlled, and as a result, the working accuracy of the work surface can be improved. In addition, since the combined force of the radial forces due to the cutting resistance of at least one pair of CBN tools are balanced and cancelled mutually, the generation of the deflection of the long scale hardened steel and the CBN tools can be suppressed and the working accuracy of the work surface can be further improved.

The cutting apparatus for cutting a long scale hardened steel according to the present invention for achieving the above object is characterized by comprising a fixing device for fixing a long scale hardened steel, a tool rest which is guided by a guide device disposed along the longitudinal direction of the fixing device, and a CBN tool for cutting a work surface of the long scale hardened steel. According to this invention, a work surface of a long scale hardened steel can be cut-worked with extremely high efficiency by the CBN tool held by the tool rest, and as a result, a guide rail of a rolling guide device can be manufactured with extremely high efficiency.

In the cutting apparatus of the long scale hardened steel of the present invention, it is preferred that the tool rest is provided, to be detachable, with a holding member for holding the CBN tool. According to this invention, the CBN tool can be easily changed through a detachable mounting of the holding member.

In the cutting apparatus of the long scale hardened steel of the present invention, it is preferred that the holding member is provided with a position adjusting means for adjusting a fixing position of the CBN tool. According to this invention, the position of the CBN tool, for example, can be finely adjusted to thereby adjust the cut amount of the CBN tool.

In the cutting apparatus for the long scale hardened steel of the present invention, it is preferred that a plurality of CBN tools are arranged on a virtual plane normal to the longitudinal direction of the long scale hardened steel so as to provide linear symmetric or point symmetric fashion. In this case, it is also preferred that at least one pair of CBN tools for cutting the work surface of the long scale hardened steel are arranged so that radial forces of cutting resistance thereof are mutually balanced. According to this invention, since the generation of deflection of the long scale hardened steel and the CBN tools can be controlled, the long term use of the guide device can be realized, and in addition, the cutting apparatus can be driven smoothly for a long time. Thus, by the cut-working of such cutting apparatus, the working accuracy of the work surface can be further improved.

BRIEF DESCRIPTION OF THE DRAWINGS

FIG. 6 is a front view in an enlarged scale of the tool rest shown in FIG. 5.

BEST MODE FOR EMBODYING THE INVENTION

Hereunder, method and apparatus for cutting a long scale hardened steel according to the present invention will be described with reference to the accompanying drawings.

(1) Cutting Method and Cutting Apparatus

Figure 1:
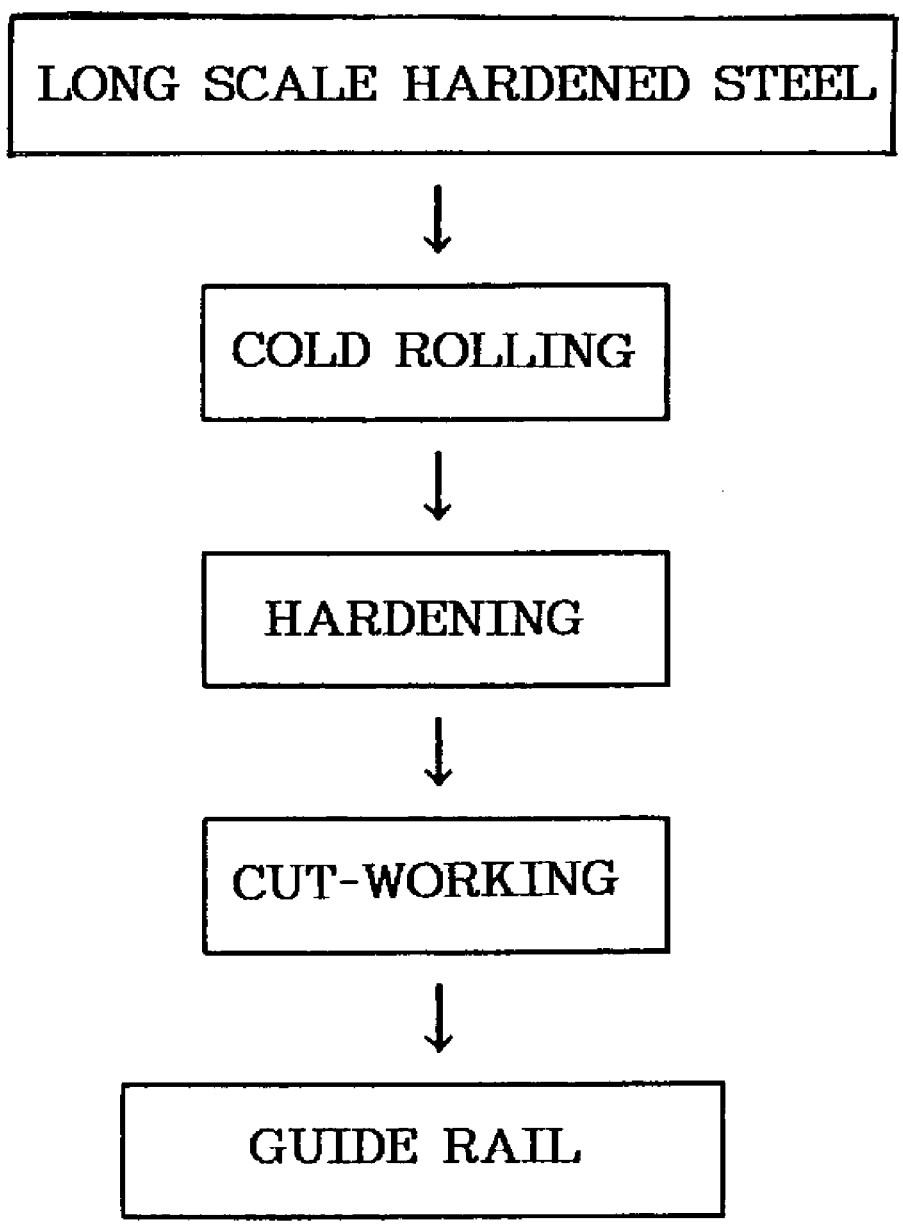
FIG. 1 is a view showing a flowchart of one example of a manufacturing method of a guide rail of a rolling guide apparatus, including a cutting method of a long scale hardened steel, according to the present invention.

The cutting method of the present invention is a method of linearly cutting a work surface of a long scale hardened steel along its longitudinal direction at a cutting speed of about 30 m/min. to 160 m/min. by using a CBN tool, and the apparatus for cutting a long scale hardened steel of the present invention is an apparatus for realizing such cutting method (hereinlater, these method and apparatus may be called (cutting method and apparatus of the present invention). According to such cutting method and apparatus, long scale hardened steel or steel members can be extremely effectively cut or cut-worked. Moreover, by applying the present invention to the manufacturing of a guide rail, for example, of a rolling guide device as represented by a flowchart of FIG. 1, the guide rail or like can be manufactured extremely efficiently with high precision, thus reducing the working time and decreasing manufacturing cost while maintaining high quality.

Figure 2:
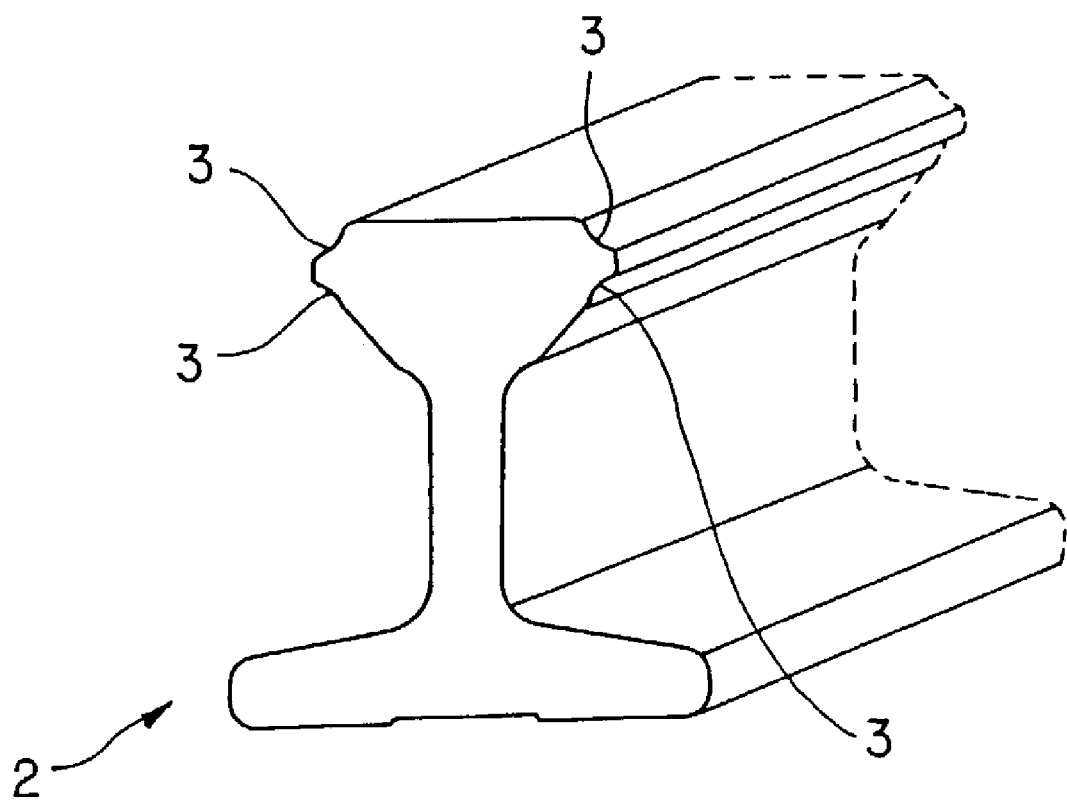
FIG. 2 is a perspective view showing one example of a long scale hardened steel to which the cutting method and cutting apparatus of the present invention is applicable.

FIG. 2 is a perspective view showing one example of a long scale hardened steel 2 to which the cutting method and cutting apparatus according to the present invention are applicable, in which four rows of work surfaces 3 extending along the longitudinal direction of the hardened steel 2 are arranged in the symmetric fashion with each other. This example represents an exemplary embodiment of a track table 102 of a rolling guide device 101 shown in FIGS. 14 to 16, which will be mentioned hereinlater, and the work surface 3 in FIG. 2 attains a function as a rolling member rolling surface 105 along which a rolling member 103 circulates endlessly. Further, it is to be noted that the work surface 3 mentioned herein is a surface to be cut and worked in accordance with the cutting method using the cutting apparatus of the present invention, and includes a surface having any shape which is not specifically limited. For example, the surface 3 includes a flat surface composed of a plane, a rectangular surface composed of combination of planes, a groove composed of curved surface and a composite surface composed of combination of plane and curved surface.

The cutting method and apparatus of the present invention is utilized preferably for the working of a hardened steel of which surface is hardened through hardened or quenching process or like. Such hardened steel is not limited in its type or kind as far as its surface is hardened through the quenching process, and for example, it is desirable to be applied to a hardened steel utilized for satisfying requirement of anti-abrasion property such as long scale linear rail or curved rail constituting a rolling guide device.

The cutting method and apparatus of the present invention has a characteristic feature such that it is especially applicable to the long scale hardened steel. Although a length of such hardened steel is not specifically limited, in a case where a long scale linear rail or curved rail of the rolling guide device is manufactured, it may be preferable for such rail member to have a work surface having length of about 2 m to 3 m. When the present invention is applied to a hardened steel having such length as mentioned above, the cutting efficiency can be improved and worked products can be manufactured with high productivity.

Figure 3:
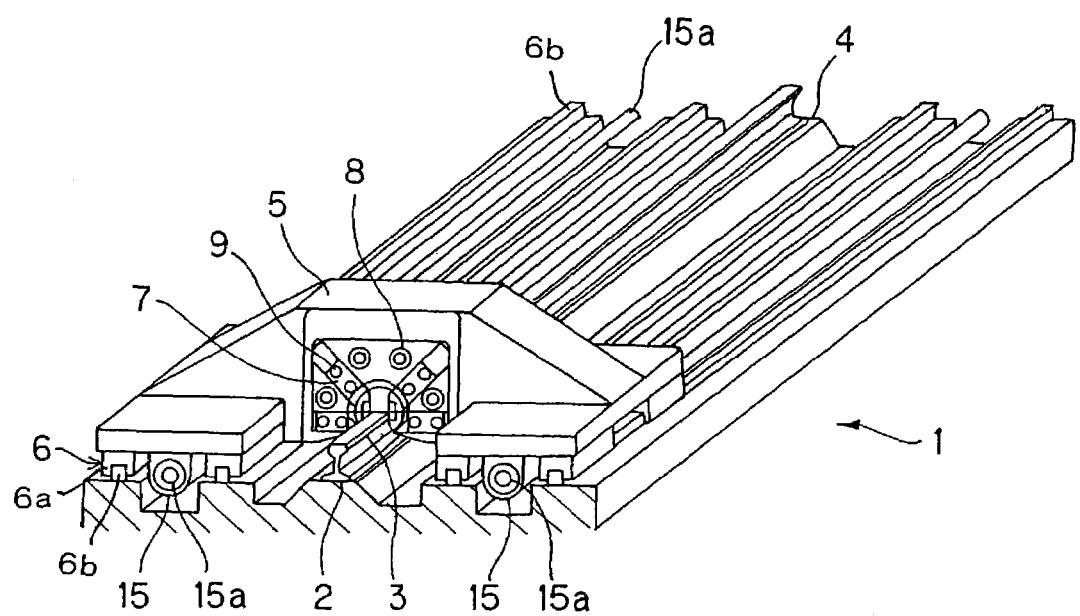
FIG. 3 is a perspective view showing one example of the cutting method and cutting apparatus of one embodiment of the present invention.

With reference to the cutting method and apparatus 1 which are applied to a linear rail or curved rail of the linear rolling guide device, as shown in FIG. 3, the long scale hardened steel 2, having a work surface of a length of about 2 m to 3 m, for the rolling guide device is fixed to a fixing device 4, and the work surface 3 extending along the longitudinal direction of the long scale hardened steel 2 is cut and worked by means of a CBN tool 7 mentioned hereinlater. Further, this fixing device 4 is provided, as mentioned hereinlater, with at least a mount table and fixing means and is adapted to fix the long scale hardened steel 2.

As means for fixing the long scale hardened steel 2 to the fixing device 4, there will be adopted a various clamps or chucks. Further, a power chuck may be also adopted, and for example, as a power chuck, hydraulic chuck, pneumatic chuck, electromagnetic chuck or like may be listed up.

The long scale hardened steel 2 fixed to the fixing device 4 is cut and worked by the CBN tool 7 holded by a tool rest 5. The CBN tool 7 is formed from a sintered material of cubic boron nitride (CBN) and by sintering, under a high temperature and an extreme high pressure, a mixture of CBN powder with Co, Tic and like. The CBN tool 7 has superiority of high hardness, high elastic coefficiency and high heat transfer property, so that the CBN tool 7 can be preferably utilized for the cutting of high hardness material, hardened (quenched) steel, heat-resistant alloy and the like.

Figure 4:
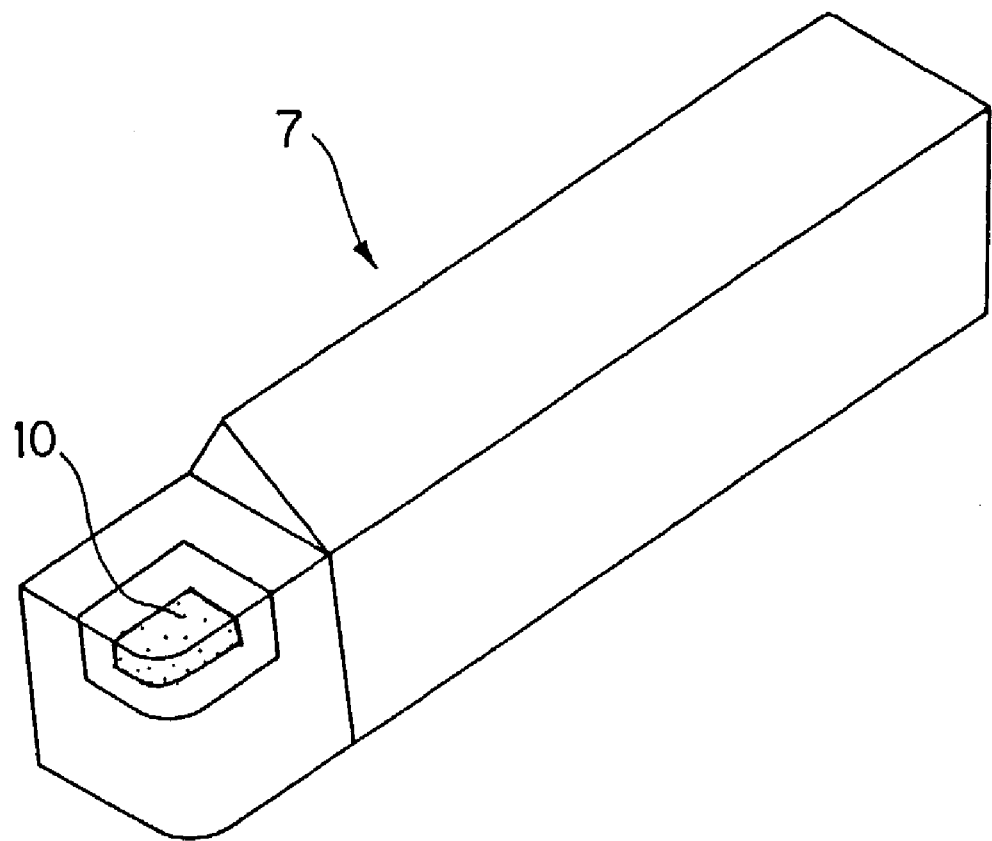
FIG. 4 is a perspective view showing one example of a CBN tool.

The CBN tool 7 is a tool, to be more specific as shown in FIG. 4, in shape of rod and is provided with a CBN sintered member 10 in form of chip at its front end. This, however, is not necessarily limited to one having the shape shown in FIG. 4, and an optimum one of conventionally known shapes such as one shown in FIG. 8(B), conforming with the shape of the work surface 3, can be optionally selected. Further, it is desirable that the CBN sintered member 10 directly related to the cut-working utilizing the CBN tool 7 has a chip shape substantially the same as the shape of the work surface 3 of the long scale hardened steel 2. By using the CBN tool 7 having the CBN sintered member 10 having such a chip shape as that mentioned above, the work surface 3 can be easily and precisely formed so as to provide substantially the same shape as that of the CBN sintered body 10 through the cutting working, thus reducing the number of cutting workings. As a result, the cutting working can be performed with extremely high efficiency and precision. Further, the use of such CBN tool 7 can make it possible to cut the work surface through a dry-type cutting working which is different from a conventionally known wet-type cutting working, thus being advantageous.

Figure 5A:
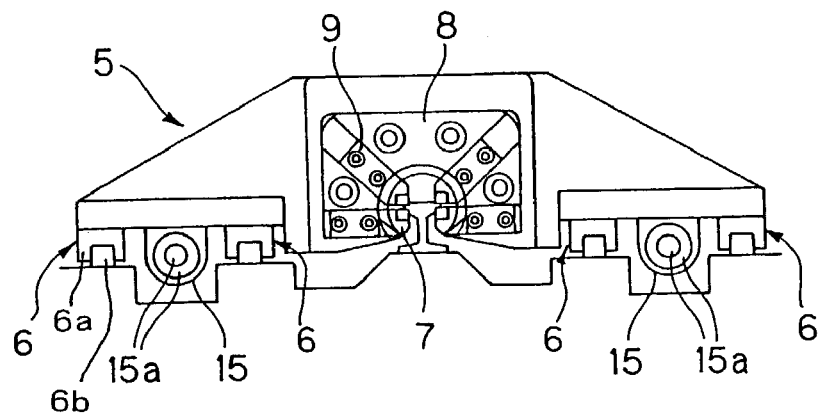
FIG. 5 includes FIG. 5(A) showing a front view of one example of a tool rest provided with a CBN tool, FIG. 5(B) showing a side view thereof and FIG. 5(C) showing a plan view thereof.
Figure 5B:
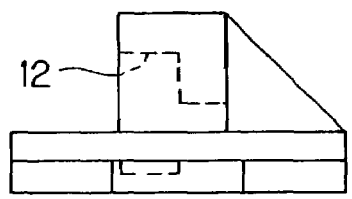
Figure 5C:
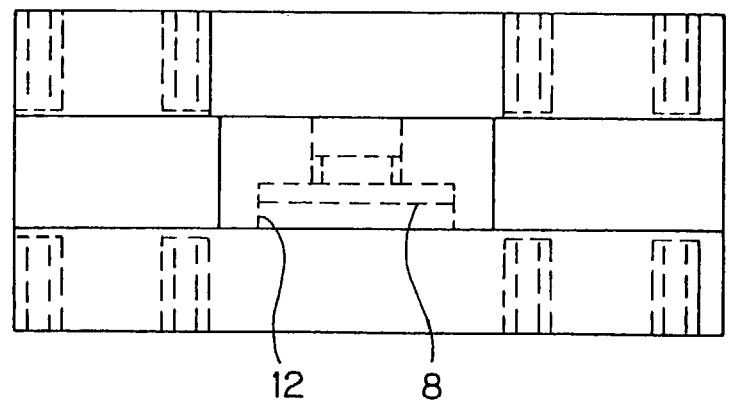
Figure 7A:
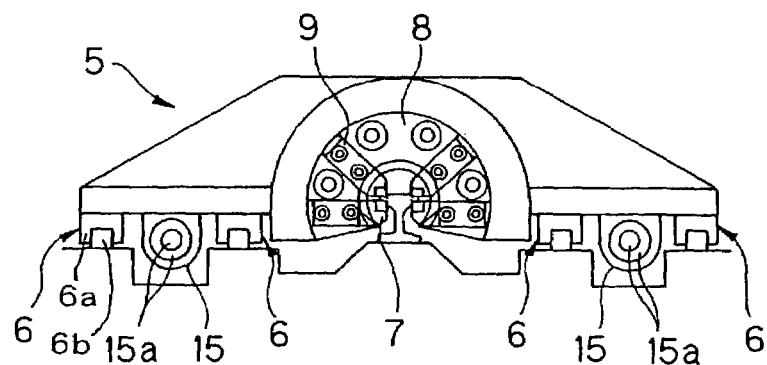
FIG. 7 includes FIG. 7(A) showing a front view of another example of a tool rest provided with a CBN tool, FIG. 7(B) showing a side view thereof and FIG. 7(C) showing a plan view thereof.
Figure 7B:
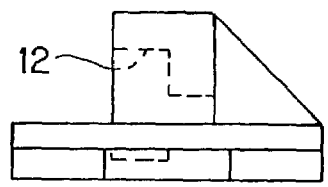
Figure 7C:
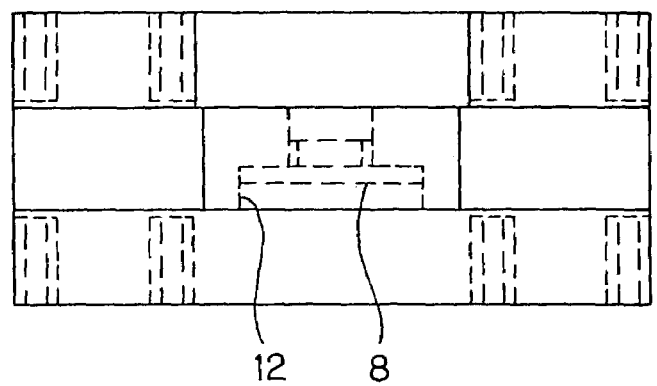

The tool rest 5 is one for mounting the CBN tool 7, as shown in FIGS. 5 to 7, which is a member for mounting the CBN tool 7, and guided by the guide device 6 in form of rail arranged along the longitudinal direction of the fixing device 4 and driven by a driving means 15. Further, it is to be noted that the shape or like of the tool rest 5 is not limited to a specific one and it is possible to adopt a structure which is movable along the longitudinal direction of the long scale hardened steel 2 fixed to the fixing device 4 and which can cut the work surface 3 of the long scale hardened steel 2 in its longitudinal direction. Furthermore, there will also be adopted with no specific limitation, as the tool rest 5. it may be possible to adopt one to which one or more than one CBN tools 7 can be directly mounted, or one to which a holder member 8 holding one or more than one CBN tools 7 can be held.

Figure 14:
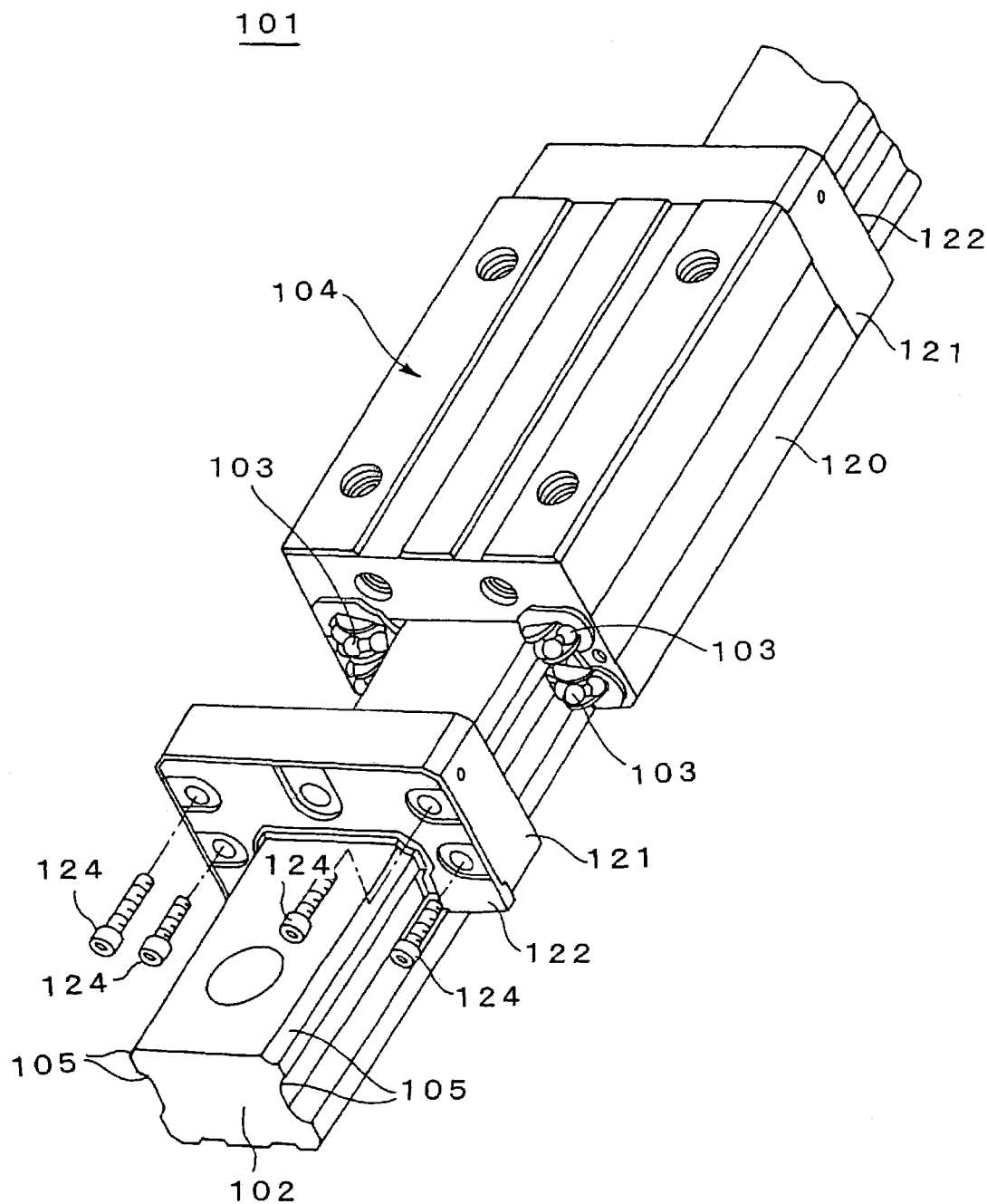
FIG. 14 is a perspective view showing one example of a rolling guide device provided with a guide rail which has been cut.
Figure 15:
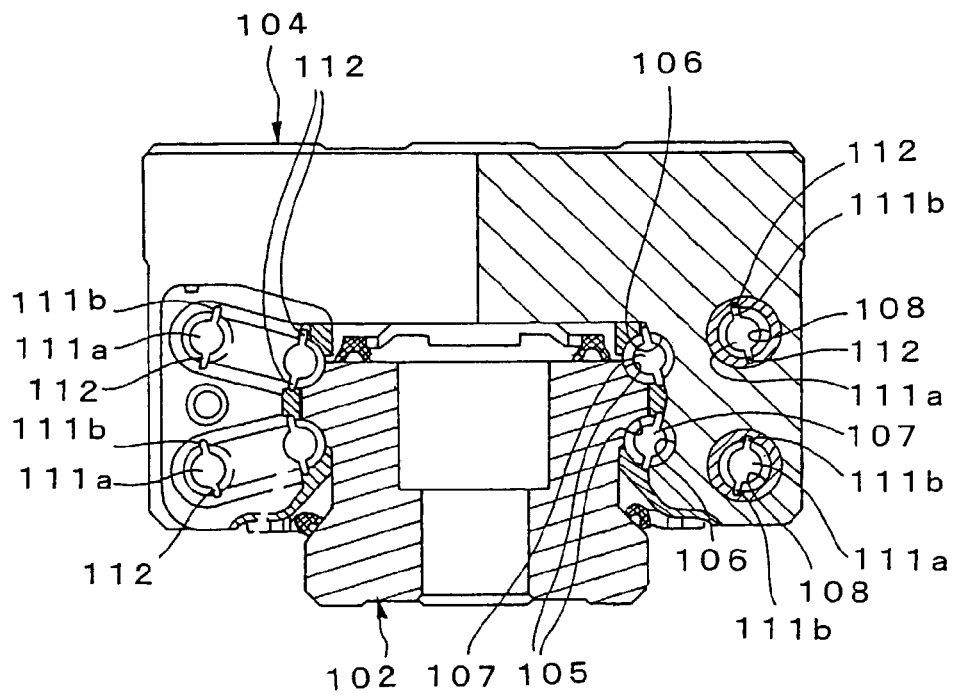
FIG. 15 is a sectional view of the device viewed in a direction normal to a guiding direction of the rolling guide device.
Figure 16:
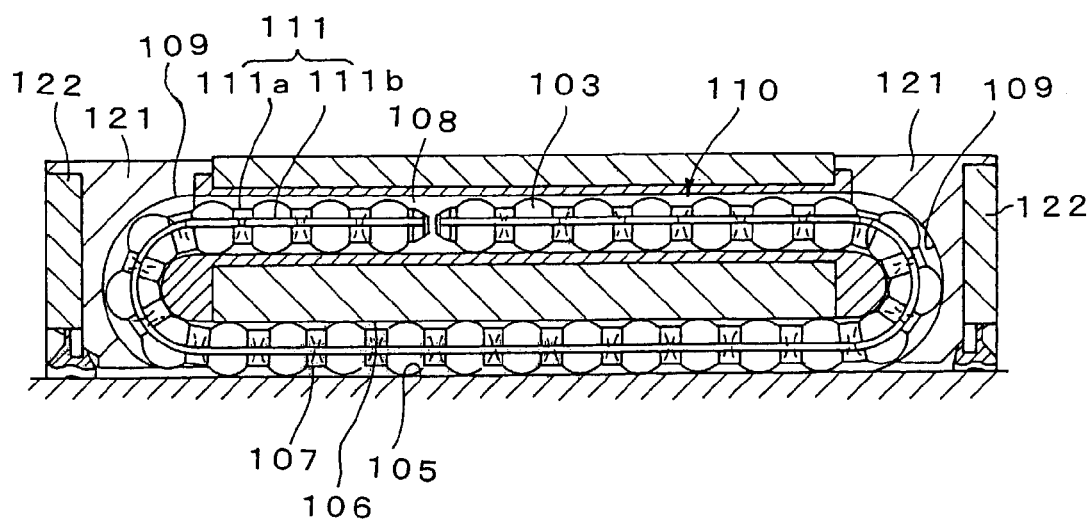
FIG. 16 is a sectional view explaining an endless circulation passage viewed from a direction along the guiding direction of the rolling guide device shown in FIG. 15.

Movement of the tool rest 5 is performed by the guidance of the guide device 6 and driving power applied by the driving means 15. As such guide device 6, there will be usable a device for guiding the tool rest 5 utilizing rolling contact such as shown in FIGS. 14 to 16. One typical example of such guide device 6 performing the guiding motion by the rolling contact comprises a guide rail 6b having a rolling member rolling surface extending along its longitudinal direction and a sliding block 6a having an endless circulation passage including a loaded rolling member rolling surface corresponding to the rolling member rolling surface, the sliding block 6a being mounted to the guide rail 6b through a number of rolling members disposed and aligned in the endless circulation passage. The guide rail 6b and the sliding block 6a can be relatively movable at the high cutting speed of such as 30 m/min. to 160 m/min. by the rolling motion of the rolling members. Further, a guide device other than the guide device 6 utilizing the sliding contact may be usable, and furthermore, as the driving means 15, although a ball screw 15a and a motor, not shown, applying a driving force to the ball screw 15a are utilized in the described embodiment, another means such as linear motor may be also used.

The holding member 8 for holding the CBN tool 7 is mounted to be detachable to the tool rest 5 (see FIGS. 5 to 7). By the detachable mounting of the holding member 8, it becomes possible to change the CBN tool 7 more easily by the integral detaching of the holding member 8. As mentioned, the technique that the CBN tool 7, which has been mounted to the holding member 8, is then mounted to the tool rest 5 makes it possible, particularly, in the case of mounting a plurality of CBN tools 7, to improve the dimensional adjustment and precision between the respective CBN tools 7 and to realize an excellent cut-working with high performance.

The dimensional adjustment in the case of mounting the CBM tool 7 to the holding member 8 is performed, as shown in FIGS. 5 to 7, by a position adjusting means 9 for adjusting the fixing position of the CBN tool 7. As such position adjusting means 9, means composed of slot and a bolt which is slidably fitted to the slot is usually used, but any other means may be adopted. In the meantime, although, in a case where a desired cutting margin is cut by one cutting operation, manual or automatic means may be used as such position adjusting means 9, in a case where the desired cutting margin is cut by two or more than two cutting operations, it is desired for the position adjusting means 9 to be automatically controlled.

The holding member 8 is fastened to a predetermined mount position 12 of the tool rest 5 by, for example, means of bolt. Such holding member 8 may, as shown in FIGS. 5 to 7, have approximately a rectangular shape or semicircular shape, which will not be limited thereto. The holding member 8 can be positioned only by inserting and fitting the holding member 8 to the mount position 12 by adopting the shape of the mount position 12 conforming with the shape of the holding member 8. Moreover, the CBN tool 7 mounted to the holding member 8 is adjusted to the predetermined position, so that the cut-working excellent in the working precision can be realized.

One or more than one CBN tools 7 will be mounted to the holding member 8. In the case of mounting a plurality of CBN tools 7, since a plurality of work surfaces 3 along the longitudinal direction of the long scale hardened steel 2 can be simultaneously cut, a plurality of work surfaces 3 corresponding to the number of the CBN tools 7 can be extremely effectively cut and worked.

Figure 9:
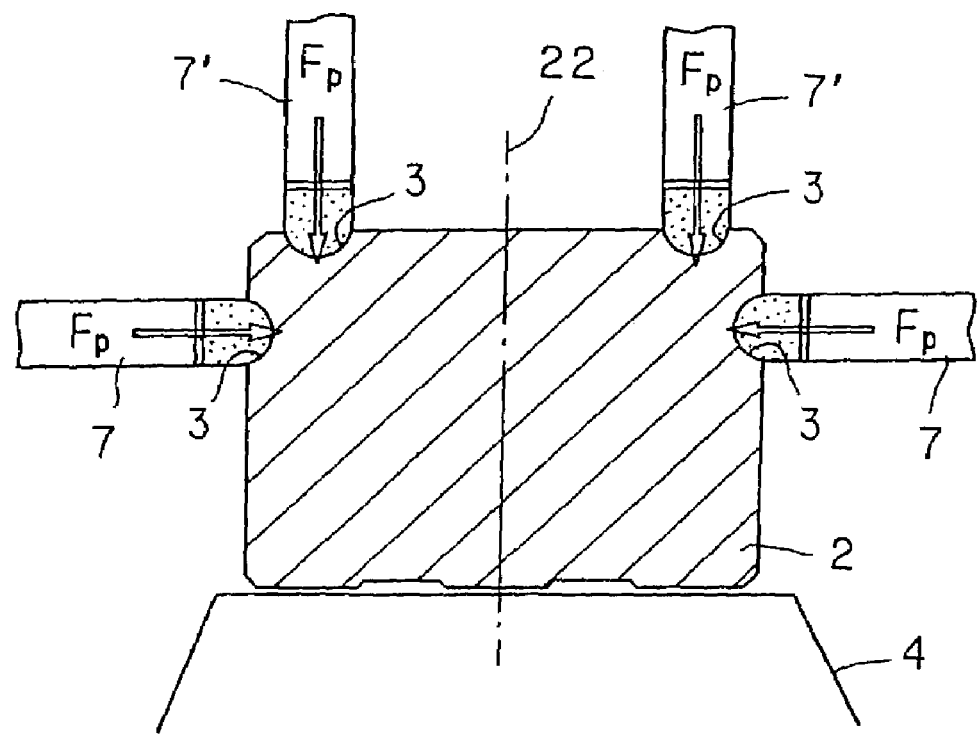
FIG. 9 is an illustration of sectional view showing one example of the CBN tools which are arranged, in a linear symmetry, to oppose to side surfaces of the work and to work surfaces opposing to a guide device.
Figure 10:
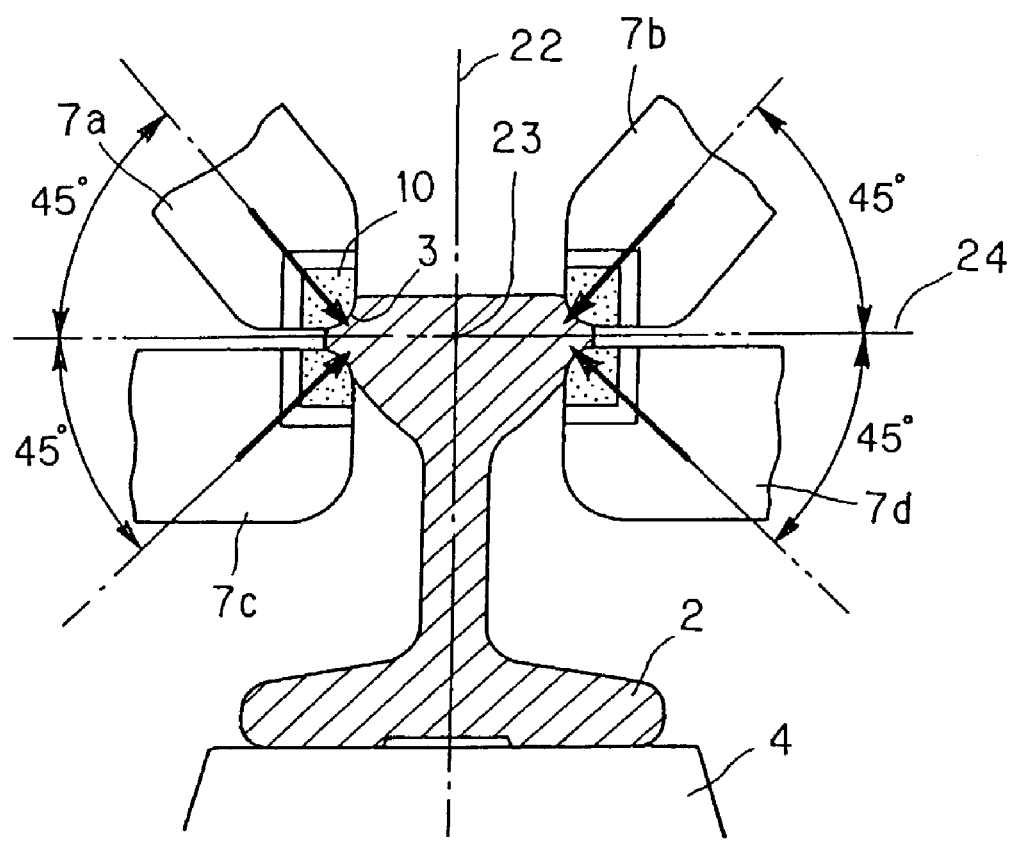
FIG. 10 is an illustrated sectional view of one example in which the CBN tools are arranged to the work surface in a point symmetric manner.
Figure 11:
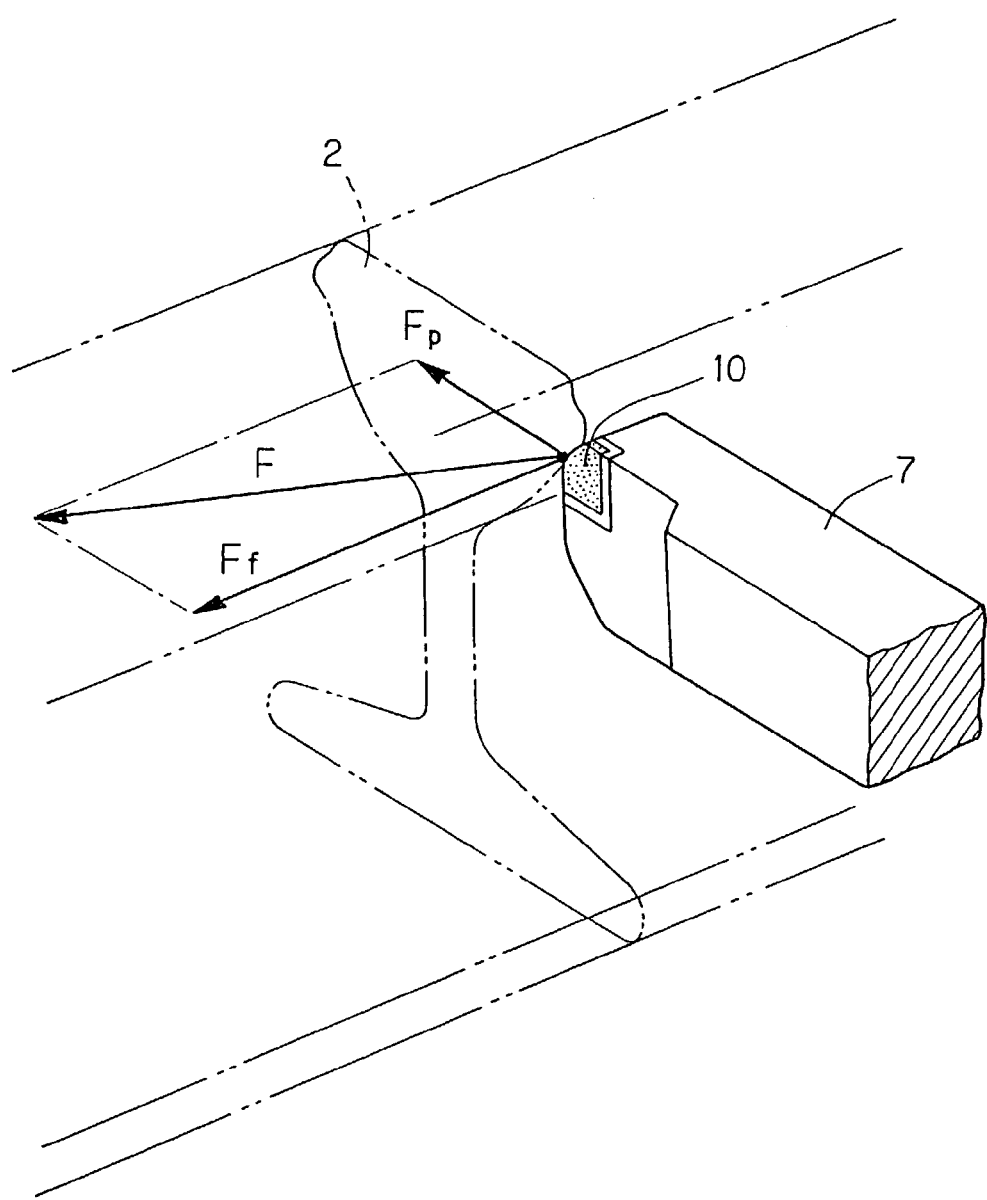
FIG. 11 is an illustration explaining a component force of cutting resistance in the cutting step.

In the case of mounting a plurality of CBN tools 7, it is desired to consider balance of load stress between the CBN tools 7 and the work surfaces 3. More specifically, as shown in FIGS. 8 to 10, it is desired to arrange the plural CBN tools 7 at linear symmetric or point symmetric portions on a virtual plane, which is a plane perpendicular in the longitudinal direction of the long scale hardened steel 2. In such case, since the plural CBN tools 7 are arranged on the virtual plane in linear symmetry or point symmetry relation, radial forces Fp of cutting resistance in the cutting operation as shown in FIG. 11 are balanced (see FIGS. 8 to 10). In an example in which the radial forces Fp are balanced, the respective radial forces Fp elastically deform the tool rest 5. However, such elastic deformation merely generates an inner stress to the tool rest 5 and is not transmitted as an external force with respect to the guide device 6. Accordingly, by arranging the CBN tools 7 in the manner mentioned above in order to balance the radial forces Fp, the generation of deflection of the long scale hardened steel 2 and/or CBN tools 7 can be suitably controlled. Further, with reference to FIG. 11, Ff represents a feed force, Fp is a radial force and F represents a resultant force (Ff+Fp) of cutting resistance.

Here, the mode of "arranged in linear symmetric manner" means arrangement in a mirror relation with respect to a reference line, and on the other hand, the mode of "arranged in point symmetric manner" means arrangement in opposed-angle relation with respect to a reference point. As such reference line and reference point, a center line 22 or 24 and specific point 23 in FIGS. 8 to 10 will be indicated.

Figure 8A:
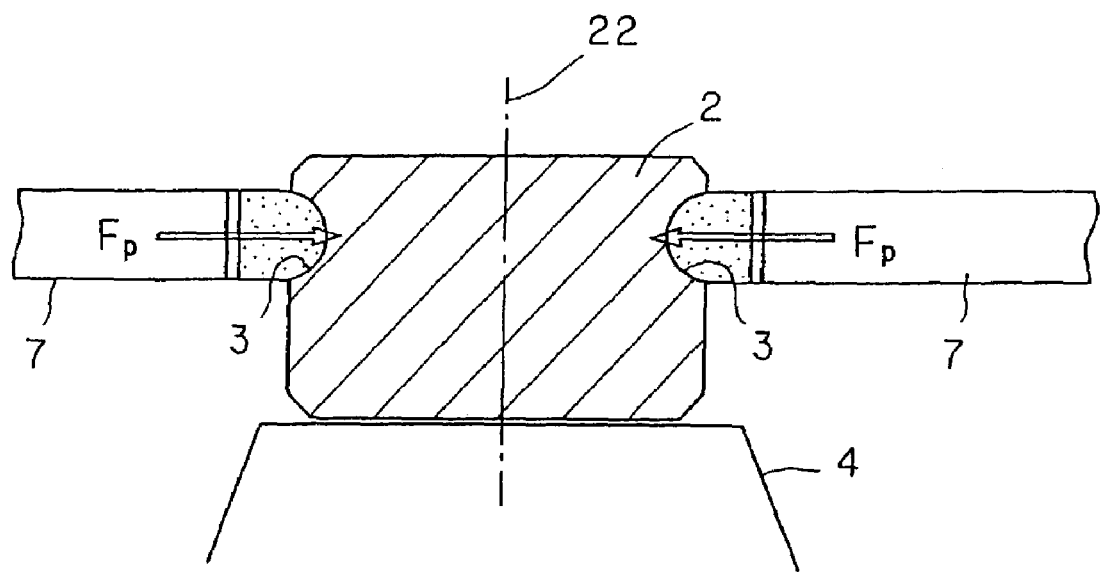
FIG. 8 includes FIG. 8(A) illustrating a schematic sectional view of one example in which CBN tools are arranged to both work surfaces in linear symmetry and FIG. 8(B) showing a CBN tool used at the cutting time.
Figure 8B:
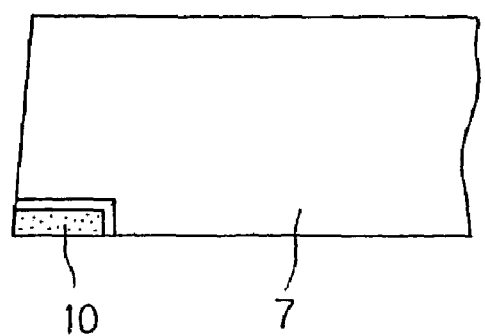

Especially, it is desired, as shown in FIG. 8(A), that at least one pair of CBN tools 7, 7 are arranged on a virtual plane so as to provide a linear symmetry with respect to the center line 22 of the long scale hardened steel 2. According to this technology, the resultant force of the radial forces Fp of the cutting resistance are balanced mutually and cancelled by each other, the deflection of the long scale hardened steel 2 and that of the CBN tools 7 due to the radial forces Fp at the cut working operation can be suppressed or substantially prevented from generating, and hence, the working performance of the work surface 3 can be further improved, thus being effective. Further, FIG. 8(B) is a plan view showing one example of the CBN tool 7.

Furthermore, it is also desired that, as shown in FIG. 9, in the arrangement of a plurality of CBN tools, at least one pair of CBN tools 7 are arranged on the virtual plane so as to provide a linear symmetry with respect to the center line 22 of the long scale hardened steel 2 so as to mutually cancel the radial forces Fp of the cutting resistance and the other CBN tools 7', 7' are arranged on the virtual plane so as to provide a linear symmetry with respect to the center line 22 of the long scale hardened steel 2. According to such arrangement, as mentioned hereinabove, the generation of deflection of the long scale hardened steel 2 and that of the CBN tools 7 due to the radial forces Fp in the cut working operation can be controlled or substantially prevented as much as possible, and hence, the working performance of the work surface 3 can be further improved. In such occasion, the CBN tools 7', 7' are not arranged so as to cancel the resultant force of the radial forces Fp, but the respective CBN tools 7', 7' are arranged in the lateral symmetry with respect to the center line. For this reason, the radial forces Fp applied to the guide device 6 is made equivalent in the lateral direction, and radial loads having the same amount are applied with respect to the guide device 6. As a result, since the loads applied to the guide device 6 can be laterally balanced, usable life time of the guide device 6 can be elongated and, in addition, the cutting device 1 can be used smoothly and safely for a long term, thus being effective. Moreover, the working performance or precision of the surface of the work to be cut-worked can be improved by working the long scale hardened steel 2 by using such cutting device 1.

Furthermore, FIG. 10 shows an arrangement mode in which CBN tools 7a, 7b, 7c and 7d are arranged on a virtual plane so as to provide point symmetry with respect to a specific point 23. In addition to that the four CBN tools 7a, 7b, 7c and 7d are arranged on a virtual plane so as to provide point symmetry with respect to a specific point 23, the CBN tools 7a and 7c and the CBN tools 7b and 7d are arranged in linear symmetry on the virtual plane with respect to the center line 22 of the long scale hardened steel 2, and furthermore, the CBN tools 7a and 7b and the CBN tools 7c and 7d are arranged in linear symmetry on the virtual plane with respect to the line 24 parallel to the fixing device 4. By arranging these four NBC tools in the described arrangement mode, the radial forces Fp of the respective CBN tools will be cancelled. As a result, as mentioned above, the usable life time of the guide device 6 can be achieved, the cutting device 1 can be driven smoothly and safely for a long term, and the working performance to the work surface 3 can be further improved. Further, it is to be noted that, although angles of the radial forces Fp of the CBN tools are respectively of 45°, these angles are not limited to specific angles, and may be optionally set in accordance with the structure of the long scale hardened steel 2 and the shape of the work surface 3 under the condition that the CBN tools are arranged at positions so that the radial forces Fp thereof are cancelled by each other.

Figure 12:
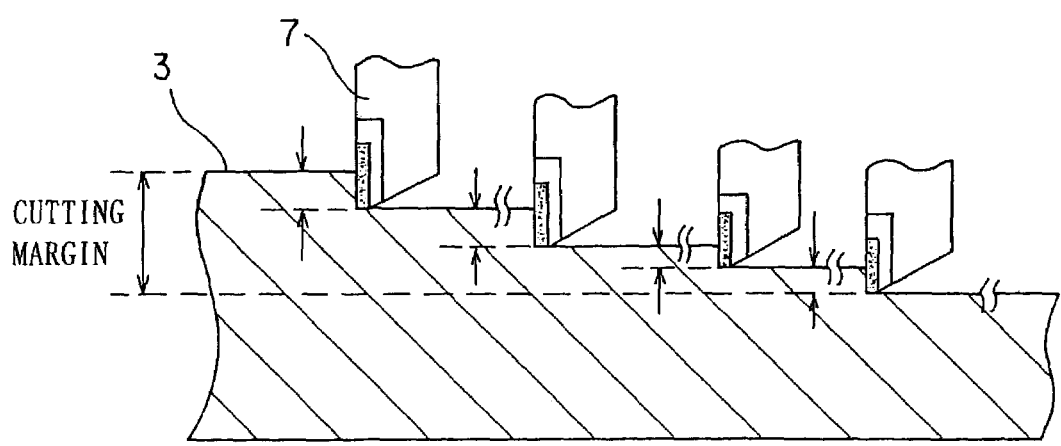
FIG. 12 is an illustration showing a case in which the work surface is cut by steps of more than two times.
Figure 13:
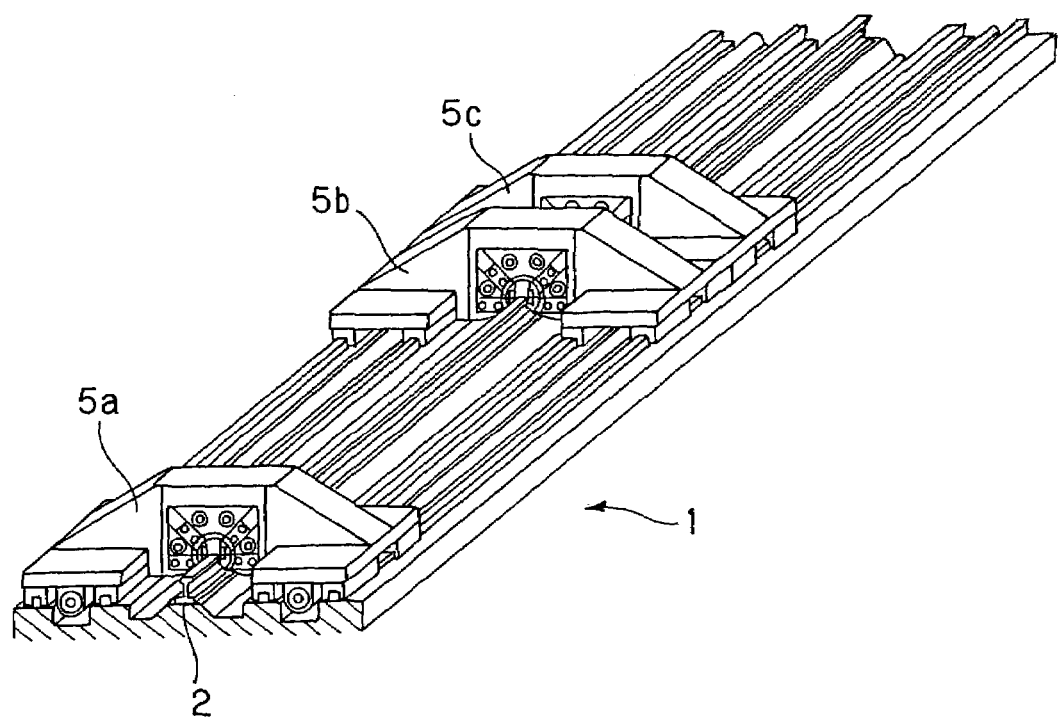
FIG. 13 is a perspective view showing arrangement of a plurality of tool rests along the longitudinal direction thereof.

In the present invention, a plurality of tool rests 5 may be arranged to the guide device 6. For example, a plurality of tool rests 5 are arranged along the longitudinal direction of the long scale hardened steel 2. Then, as shown in FIGS. 12 and 13, first, the cutting operation through the first stage is carried out by moving the first tool rest 5a, then, the cutting operation through the second stage is carried out by moving the second tool rest 5b, next, the cutting operation throug the third stage is carried out by moving the third tool rest 5c, and thereafter, succeeding cutting operations are carried out in the same manner. As mentioned above, by successively feeding these plural tool rests from one side towards the other side in the longitudinal direction by the guide device 6, the work surface 3 having a predetermined cutting margin can be cut in an extremely short time. Particularly, by mounting the plural CBN tools 7 mentioned hereinbefore to such tool rests 5, work surfaces 3 of a plurality of works can be extremely efficiently cut, thus achieving remarkable effects.

In the present invention, it is preferred to linearly cut the work surface 3 of the long scale hardened steel 2 at a speed of about 30 m/min. to 160 m/min., and more preferably, to linearly cut it at a speed of about 80 m/min. to 120 m/min. The reason why the linear cutting speed is prescribed to such range resides in the relation to wearing amount of the CBN tool 7, and in this range, the wearing of the CBN tool 7 less occurs. In the case of the linear cutting speed of less than about 30 m/min., the cutting resistance becomes large and heat amount to be transferred to the CBN tool 7 will be increased, and as a result, the wearing of the CBN tool 7 will be increased in amount and the cutting efficiency will be deteriorated. On the other hand, in the case of the linear cutting speed of more than about 160 m/min., the CBN tool 7 will be also much worn.

The long scale hardened steel 2, which has been cut-worked into predetermined dimensions by cutting the predetermined cutting margin (i.e., cutting amount), is cut as it is or thereafter so as to form a linear rail or curved rail having a predetermined length. Further, although a range of the cutting margin is not generally mentioned because the range of the cutting margin relates to the hardness of the work surface 3 of the hardened steel and the number of cutting of the CBN tool 7 mentioned above. As the cutting margin capable of being cut one time with excellent cutting efficiency, the range is generally of 0.05 to 0.3 mm. In a case where the cutting margin is cut in two or more than two times, the cutting margin can be changed in every cutting operation as shown in FIG. 8. For example, the work surface 3 to be cut having the cutting margin of 0.7 mm will be cut with cutting margin of 0.3 mm (first time), 0.3 mm (second time), 0.05 mm (third time) and 0.05 mm (fourth time). According to the cutting method and cutting apparatus of the present invention, different from a wet-type cut-working in prior art, the cut-working can be advantageously performed by the dry-type system, but as occasion demands, water-soluble working solution may be utilized or pneumatic air may be also utilized.

As mentioned hereinabove, the long scale hardened steel 2 worked by the cutting method and cutting apparatus of the present invention can be preferably utilized as a guide rail of a rolling guide device. According to the present invention, it is also possible to cut the hardened steel by the predetermined amount of the cutting margin through one working operation, so that the cut-working time can be shortened in comparison with prior art in which the work surface is worked particularly through the cutting operation. In addition, in the cutting apparatus of the present invention, since the tool rest on which the CBN tool is mounted can be moved, the tool rest can be made light in weight based on its structure, and hence, a faster cutting speed such as mentioned above can be easily realized. Furthermore, by moving, at predetermined speed, the tool rest mounted with at least the CBN tool, the work surface of the long scale hardened steel placed on the fixing device can be cut-worked, so that the size or dimension of the apparatus itself and complicated control function of the apparatus can be eliminated. As a result, the cutting apparatus can be made compact in size and manufacturing cost thereof can be reduced.

A guide rail or like worked in accordance with such cutting method by using such cutting apparatus as mentioned above can be manufactured extremely efficiently, thus easily manufacturing the apparatus, producing a product having merit in cost and preferably providing it in market.

Hereunder, an experimental example will be described.

First, a round steel material for a linear motion rail of a rolling guide device (material corresponding to S55C, medium carbon manganese steel) was cold-rolled, and thereafter, hardened to thereby form a work material (worked member) having a desired surface hardness.

The work material was fixed on a fixing device by means of clamp and a CBN tool (Manufactured by De Beers as DBA80). On the cut working, any cutting solution was not used and dry-type process was adopted. As conditions for the cutting operation, a linear cut working was performed at a cutting speed of 60 m/min. by changing the cutting rate within a range of 0.1 to 0.5 mm with each cut-working being performed by single-pass.

The evaluation to the cutting workability was done by considering the condition of the CBN tool (visual observation of defect, wearing and like) and the condition of the worked surface (visual observation of gouge, chatter, roughness and like).

As a result, under the cutting condition mentioned above, no defect and wearing was observed to the CBN tool. There caused no phenomenon providing a problem with respect to the worked surface condition.

(2) Rolling Guide Device

According to the cutting method and apparatus for cutting a long scale hardened steel of the present invention, a track table (i.e., guide rail) as a constitutional member of a rolling guide device is manufactured. Hereunder, a rolling guide device provided with such track table, will be explained.

FIG. 14 shows one example of such rolling guide device. The rolling guide device 101 is composed of a track table 102 and a movable block (member) 104 through a number of spherical rolling members 103, 103, - - - , 103 interposed therebetween.

The track table 102 is manufactured according to the cutting method by using the cutting apparatus of the present invention of the characters mentioned hereinbefore, and in the embodiment shown in FIG. 14, the track rail 102 is a long scale member having approximately a rectangular section. On both the side surfaces of the track table 102, respectively two rolling member rolling surfaces 105, 105 - - - , each having a circular cross section, for rolling the rolling members 103 are disposed along the entire length thereof. Further, the number of the rolling member rolling surfaces 105 is not limited to two rows, and one, three in bilateral combination, or four rows may be adopted. Such rolling member rolling surfaces 105 can be worked with high precision and efficiency by utilizing the CBN tools arranged in predetermined positions in accordance with the cutting method and apparatus of the present invention mentioned hereinbefore.

The movable block 104 is composed of a movable block body 120 having a gate shape of one surface in a direction perpendicular to the moving direction of the movable block 104 and lid members 121 provided at both end portions in the moving direction of the movable block 104.

Four rows (each two rows) of rolling member rolling surfaces 106, each having approximately a semi-circular shape in cross section, are formed to inside surfaces of the movable block body 120, as shown in FIG. 15, so as to oppose to the rolling member rolling surfaces 106, 106, - - - , respectively. These rolling member rolling surfaces 105 and 106 constitute four loaded rolling passages are formed between the track table 102 and the movable block 104. The movable block 104 is also formed with return passages 108, 108, - - - , each having a circular cross section, so as to extend from one end to the other end in the moving direction of the movable block 104.

On the other hand, as shown in FIG. 16, each of the lid member 121 is formed with a direction changing passage, for changing the rolling direction of the rolling members, on a surface opposing to the movable block body 120 of the lid member 121 so as to communicate the loaded ball rolling passage 107 and the return passage 108. These loaded rolling passage 107, the return passage 108 and the direction changing passage 109 constitute the endless circulation passage 110 for endlessly rolling the rolling members 103, 103, - - - , 103.

A number of spherical rolling members 103, 103, - - - , 103 are disposed in the endless circulation passage so as to provide a continuous bead-like form by means of connection member 111. The connection member is composed of a number of spacers 111*a* disposed between the respective rolling members 103, 103, - - -, 103 and belt-like portions in form of thin plate disposed so as to connect the respective spacers 111*a* and hold them from their both sides to be rotatable.

The endless circulation passage 110 is also formed therein with connection member guide grooves 112, 112 to which the belt like portions 112*b*, 112*b* are fitted to be slidable for slidably guiding the connection members 111 therein.

The rolling members 103, 103, - - -, 103 roll in the loaded rolling passage 107 from its one end towards its other end. Thereafter, the rolling members are scooped by the direction changing passage 107, guided toward one end of the return passage 108 and then guided to other end of the other return passage 108. Thereafter, the rolling members 103 are again guided to the loaded rolling passage 107 through the direction changing passage 109. By repeating the above rolling motions, the rolling members 103, 103, - - -, 103 are moved and circulated in the endless circulation passage 110 in accordance with the movement of the movable block 104. The track table 102 manufactured by the cutting method and apparatus of the present invention has the rolling member rolling surface 105 which can be worked with high performance by using the CBN tool, so that the rolling members 103, 103, - - -, 103 can be smoothly circulated in the endless circulation passage 110.

Furthermore, as shown in FIG. 14, end plates 122, 122 are attached to the outer side surfaces of the lid members 121, 121. Each of these end plates 122 has substantially gate-shape and is attached, by means of screws 124, 124, - - -, 124, to the lid member 121.

Provability of Industrial Usage

According to the long scale hardened steel cutting method and cutting apparatus of the present invention, since the long scale hardened steel can be extremely efficiently cut, the present invention can be contributed to the efficient manufacturing of a guide rail by applying, for example, to the manufacturing of the guide rail of a rolling guide apparatus

The invention claimed is:

1. A method of cutting longitudinally extending hardened steel, comprising:
   mounting the longitudinally extending hardened steel on a surface of a mounting table, the surface of the mounting table on which the longitudinally extending hardened steel is mounted extending longitudinally in the longitudinal direction longitudinally extending hardened steel;
   guiding a tool rest to move in a longitudinal direction of the longitudinally extending hardened steel by a guide device extending in longitudinally direction of the surface of the mounting table; and
   cutting a work surface of the longitudinally extending hardened steel with a CBN tool attached to the rest.

2. The method of cutting longitudinally extending hardened steel according to claim 1, further comprising cutting a plurality of work surfaces of the longitudinally extending hardened steel with a plurality of CBN tools attached to the tool rest.

3. The method of cutting longitudinally extending hardened steel according to claim 1 or 2, further comprising:
   arranging a plurality of CBN tools along the longitudinal direction of the longitudinally extending hardened steel; and
   cutting the work surface of the longitudinally extending hardened steel sequentially along the longitudinal direction thereof.

4. The method of cutting a longitudinally extending hardened steel according to claim 1 or 2, wherein the cutting a work surface comprises cutting the hardened steel into the shape of a guide rail of a rolling guide device.

5. The method of cutting longitudinally extending hardened steel according to claim 4, wherein the shape of the guide rail of the rolling guide device includes a rolling member rolling groove to accommodate a rolling member.

6. The method of cutting longitudinally extending hardened steel according to claim 1 or 2, further comprising arranging a plurality of CBN tools on a virtual plane normal to the longitudinal direction of the hardened steel so as to provide linear symmetric or point symmetric arrangement.

7. The method of cutting longitudinally extending hardened steel according to claim 6, further comprising arranging at least one pair of CBN tools for cutting the work surface of the hardened steel so that radial forces of cutting resistance are mutually balanced.

8. The method of cutting longitudinally extending hardened steel according to claim 1, wherein the cutting comprises cutting the work surface of the longitudinally extending hardened steel with a CBN tool at a cutting speed of approximately 30 m/min. to 160 m/min.

* * * * *